F. KAMMERER.
METHOD OF PRODUCING HOLLOW WIRE FOR MANUFACTURING OF CHAINS AND THE LIKE.
APPLICATION FILED AUG. 9, 1920.
1,421,491. Patented July 4, 1922.
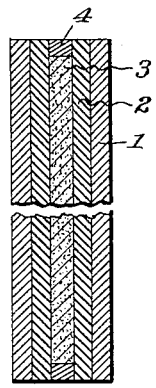
Inventor
*Friedrich Kammerer,*
By
Attorney

UNITED STATES PATENT OFFICE.

FRIEDRICH KAMMERER, OF PFORZHEIM, GERMANY.

METHOD OF PRODUCING HOLLOW WIRE FOR MANUFACTURING OF CHAINS AND THE LIKE.

1,421,491.     Specification of Letters Patent.     Patented July 4, 1922.

Application filed August 9, 1920. Serial No. 402,493.

*To all whom it may concern:*

Be it known that I, FRIEDRICH KAMMERER, of Pforzheim, a citizen of Pforzheim, Germany, have invented certain new and useful Improvements in a Method of Producing Hollow Wire for Manufacturing of Chains and the like (for which I have filed applications in Germany No. K 67,488/7b, October 26, 1918), of which the following is a specification.

So-called solder-wire has already been used for many years in the fine-chain industry. This solder-wire consists of any preferred metal (precious and non-precious metal) with a core or cores of any shape made of solder, so that the putting on of pieces of solder is made unnecessary. On the other hand, suggestions have already been made to furnish solder-sticks, that is to say tin-sticks, from which the solder was taken in the soldering, with a flux and, finally, the attempt has already been made to furnish the solder-wire itself with an inlayer of flux, so that the exceedingly tedious and expensive treatment with borax is got rid of. But all these attempts have failed, as no uniform, serviceable product has been obtained. The solder-wire with flux inlayer hitherto tried has no uniform core of flux running through it, and therefore faulty places frequently appear. The flux made the solder-wire so hard that the drawing-block became cracked and broken and in consequence of its hardness the wire itself could not be used for all kinds of work. A further disadvantage is that, in the heating, the flux comes out of the joint and flows on the surrounding surface, so that the solder comes on to the same, without the joint itself being soldered. In the same way the soldering of the joint is prevented, as in consequence of the swelling of the borax the solder is forced out of the joint.

The hitherto existing difficulties are got rid of with the present invention, heated or dehydrated borax being embedded as flux in the solder-wire. The advantage of the dehydrated borax is that it does not undergo any essential heat expansion and consequently at the beginning of the work the partial throwing of the borax filling medium out of the drawing-block is avoided. In particular, when dehydrated borax is used, the formation of hollow spaces is entirely obviated. The advantage of this is that, in the case of non-uniform heating, the borax does not go here and there in the already partially drawn-out hollow wire. In the further thinning of the wire in the drawing, moveover, the formation of defective places is prevented. With the employment of dehydrated borax for filling the wire, an extremely uniform and fine stream of flux can be obtained inside the wire. 8 to 12 grammes of borax to 1 kilogramme of metal is sufficient. This proportion not only means a substantial saving of the at present extremely expensive borax but, beyond this, results in exceedingly uniform and clean work, in which any defective places are completely avoided. Even more considerable is the saving of the solder-metal. In the manufacture as carried on hitherto 40 to 50 grammes of fine silver were employed for the hard solder per kilogramme of chain metal. In the present invention one third of this quantity is sufficient. By the present invention the manufacture of fine chains is not only cheapened but made easier. The boiling of the suspended chains in borax, the breaking of the chains, scouring of the same, and the covering with solder-resisting material, are got rid of in the present method, thus there is a saving of working power and material.

The process may be carried out in the following manner:—

First, the borax is prepared. This is accomplished by heating the borax sufficiently to drive off the water of crystallization, thereby changing the borax into a foamy mass of dehydrated borax which is then ground fine and is tamped into the bore or opening of a tube of solder metal to provide a core of flux therein. The two openings of the bore of solder metal are then closed with plugs. The tube of solder metal is contained within a hollow metal wire, for instance, silver wire, and the drawing block, which is provided with a bore hole, can then be operated to draw out the hollow wire with its tube of solder metal and core of borax in the same manner as the drawing of a solid wire.

In the accompanying drawing the figure is a sectional view of a portion of a solder wire.

In the drawing 1 designates the metal wire, for instance, a silver wire, in which is arranged the tube 2 of solder and the core 3 of flux is located within the tube of solder. The plugs 4 are arranged within the ends of the bore of the tube of solder for confining the plugs therein during the drawing operation.

In spite of, or perhaps in consequence of numerous manipulations, numerous defective places cannot be avoided. In the mechanical production of the wire with the flux all accidental occurrences are avoided, so far as a really serviceable hollow wire with flux is used, but this is even then only possible if dehydrated borax be employed for the filling. As stated, at the outset, flux is embedded in the soldering medium, the solder itself.

Having thus described my invention I claim as new and desire to secure by Letters Patent of the United States:

1. A method of producing hollow wire for the manufacture of chains, consisting in embedding dehydrated borax as flux in the hollow wire and then drawing out the latter in the known manner.

2. The herein described method of producing hollow solder wire, which consists in applying heat to borax to dehydrate the same, grinding the resultant mass into a fine powder, packing the powdered mass within a tube of solder metal contained within a hollow wire to form a core of flux within the said solder tube and finally drawing the hollow wire with its tube of solder and core of flux.

FRIEDRICH KAMMERER.